United States Patent
Gauthier et al.

(10) Patent No.: US 12,157,377 B2
(45) Date of Patent: *Dec. 3, 2024

(54) REDUNDANT VEHICLE POWER DISTRIBUTION SYSTEM

(71) Applicant: Atieva, Inc., Newark, CA (US)

(72) Inventors: Jean-Philippe Gauthier, San Francisco, CA (US); Richard J. Biskup, Sunnyvale, CA (US); Thomas Joel Huber, San Francisco, CA (US)

(73) Assignee: Atieva, Inc., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,290

(22) Filed: Dec. 22, 2022

(65) Prior Publication Data

US 2023/0234449 A1 Jul. 27, 2023

Related U.S. Application Data

(63) Continuation of application No. 16/811,235, filed on Mar. 6, 2020, now Pat. No. 11,541,758.

(51) Int. Cl.
*B60L 3/00* (2019.01)
*G05D 1/00* (2024.01)
(Continued)

(52) U.S. Cl.
CPC .......... *B60L 3/0092* (2013.01); *G05D 1/0088* (2013.01); *H02J 7/0013* (2013.01);
(Continued)

(58) Field of Classification Search
CPC . B60L 3/0092; B60L 2210/10; G05D 1/0088; H02J 7/0013; H02J 7/0063; H02J 9/06
(Continued)

(56) References Cited

U.S. PATENT DOCUMENTS 7,952,488 B1    5/2011  Zansky et al.
9,828,107 B1 *  11/2017 Ruymgaart ............ B64D 31/00
(Continued)

FOREIGN PATENT DOCUMENTS

DE    102008010979 A1    8/2009
DE    102015200124 A1    7/2016

OTHER PUBLICATIONS

International Search Report and Written Opinion for PCT Application No. PCT/US2021/070184, dated May 19, 2021, 18 pages.
(Continued)

*Primary Examiner* — Michael R. Fin
(74) *Attorney, Agent, or Firm* — Brake Hughes Bellermann LLP (57) ABSTRACT

A power distribution system is provided that ensures that a car is able to operate safely in an autonomous mode. The system includes multiple power rails, including a pair of safety critical power rails. Associated with each safety critical power rail is a safety switch, vehicle sensors (e.g., vehicle location and obstacle sensors), vehicle actuators (e.g., braking and steering actuators) and an autonomous control unit. If a fault is detected during vehicle initialization or general operation, the safety switch which detected the fault opens and that particular power rail is decoupled from the general purpose power rail as well as the remaining safety critical power rail. The remaining safety critical power rail is then able to provide power to a sufficient number of sensors, actuators and controllers to allow the car to safely and autonomously complete an emergency stop on the side of the road.

20 Claims, 3 Drawing Sheets

(51) Int. Cl.
*H02J 7/00* (2006.01)
*H02J 9/06* (2006.01)

(52) U.S. Cl.
CPC .............. *H02J 7/0063* (2013.01); *H02J 9/06* (2013.01); *B60L 2210/10* (2013.01)

(58) Field of Classification Search
USPC ...................................................... 307/10.1
See application file for complete search history.

(56) References Cited

U.S. PATENT DOCUMENTS

| | | | |
|---|---|---|---|
| 11,117,532 B2 * | 9/2021 | Ferré Fàbregas | H02J 1/10 |
| 11,476,704 B2 * | 10/2022 | Takahashi | H02J 9/068 |
| 11,541,758 B2 * | 1/2023 | Gauthier | H02J 1/086 |
| 2006/0253726 A1 * | 11/2006 | Kukshya | G06F 11/202 |
| | | | 714/E11.078 |
| 2014/0081509 A1 | 3/2014 | Koch et al. | |
| 2018/0029474 A1 | 2/2018 | Berels et al. | |
| 2018/0208243 A1 | 7/2018 | Kim et al. | |
| 2019/0135206 A1 | 5/2019 | Sturza et al. | |
| 2019/0210473 A1 | 7/2019 | Linehan et al. | |
| 2019/0337403 A1 * | 11/2019 | Tanaka | H01M 8/04303 |
| 2020/0047624 A1 | 2/2020 | Tsai et al. | |
| 2020/0047634 A1 * | 2/2020 | Akaishi | B60L 53/62 |
| 2021/0237670 A1 * | 8/2021 | Takahara | H02J 9/06 |

OTHER PUBLICATIONS

Extended European Search Report for European Application No. 21764129.9, mailed Feb. 20, 2024, 14 pages.

* cited by examiner

REDUNDANT VEHICLE POWER DISTRIBUTION SYSTEM

CROSS-REFERENCE TO RELATED APPLICATION

This application is a continuation of, and claims priority to, U.S. patent application Ser. No. 16/811,235, filed on Mar. 6, 2020, entitled "REDUNDANT VEHICLE POWER DISTRIBUTION SYSTEM," the disclosure of which is incorporated by reference herein in its entirety.

FIELD OF THE INVENTION

The present invention relates generally to a vehicle and, more particularly, to a cost-effective vehicle power distribution system that allows an autonomously driven vehicle to safely stop upon the occurrence of a critical electrical system failure.

BACKGROUND OF THE INVENTION

In a conventional vehicle, regardless of whether the car utilizes an internal combustion engine (ICE), a hybrid power train, or an all-electric power train, components in both the brake and steering systems commonly utilize one or more power assist systems. For example, steering systems typically include a power assist system that reduces the effort required to steer the car, especially at low speeds, while minimizing the feedback that results from driving over a rough surface. Similarly, the brake system may include a power brake booster, an anti-lock braking (ABS) system, a traction control system and electronic stability control (ESC) as well as a number of other systems that provide the driver with enhanced braking and improved traction control. Since these systems simply enhance the vehicle's underlying mechanical systems, if the car encounters a critical failure in the power/drive system that prevents the assist systems from receiving power, the driver is still able to safely bring the car to a stop off to the side of the road relying solely on the mechanical systems.

While the use of power assist systems in conventional vehicles has provided a significant improvement in car handling and driver comfort, these same systems present a significant issue when used in a vehicle providing autonomous operation. In a vehicle operating in an autonomous mode, during a critical failure in the power system there is no driver to take control of the car. Since the steering and braking systems in a car operating autonomously rely solely on electrical power, a critical failure in the power delivery system can have catastrophic consequences. Accordingly, the common approach in such a vehicle is to provide fully redundant power distribution systems, thus ensuring that if the car experiences a failure in one power distribution system, the redundant system can take over control of the vehicle. This approach, unfortunately, requires multiple batteries, multiple chargers, etc., thereby significantly increasing vehicle complexity and cost. Accordingly, what is needed is a power distribution system that ensures that the car is able to operate safely in autonomous mode, while still providing a cost competitive and reliable system. The present invention provides such a power distribution system.

SUMMARY OF THE INVENTION

The present invention provides a power distribution system configured for use in a vehicle, the system including (i) a vehicle power switch adjustable between a vehicle on mode and a vehicle off mode; (ii) a general purpose power rail, the general purpose power rail electrically connected to a power source when the vehicle is in the vehicle on mode and electrically disconnected from the power source when the vehicle is in the vehicle off mode; (iii) a first battery electrically connected to a first safety critical power rail; (iv) a first safety switch; (v) a second battery electrically connected to a second safety critical power rail; and (vi) a second safety switch. The first safety switch includes (i) a first actuator which, when closed, electrically connects the first safety critical power rail to the general purpose power rail and which, when open, electrically disconnects the first safety critical power rail from the general purpose power rail; (ii) a first circuit coupled to the first actuator which applies a first voltage to the first actuator to close the first actuator upon receipt of a first close request control signal, and which discontinues applying the first voltage to the first actuator to open the first actuator upon receipt of a first open request control signal, where the first circuit performs at least one diagnostic test corresponding to the first safety critical power rail, and where the first circuit discontinues applying the first voltage to the first actuator in order to open the first actuator when the first circuit detects a fault corresponding to the first safety critical power rail during performance of the at least one diagnostic test; and (iii) a first electronic control unit (ECU) coupled to the first circuit, the first ECU generating the first close request control signal and generating the first open request control signal, where the first ECU is configured to communicate the first close request control signal and the first open request control signal to the first circuit. The second safety switch includes (i) a second actuator which, when closed, electrically connects the second safety critical power rail to the general purpose power rail and which, when open, electrically disconnects the second safety critical power rail from the general purpose power rail; (ii) a second circuit coupled to the second actuator which applies a second voltage to the second actuator to close the second actuator upon receipt of a second close request control signal, and which discontinues applying the second voltage to the second actuator to open the second actuator upon receipt of a second open request control signal, where the second circuit performs at least one diagnostic test corresponding to the second safety critical power rail, and where the second circuit discontinues applying the second voltage to the second actuator in order to open the second actuator when the second circuit detects a fault corresponding to the second safety critical power rail during performance of the at least one diagnostic test; and (iii) a second ECU coupled to the second circuit, the second ECU generating the second close request control signal and generating the second open request control signal, where the second ECU is configured to communicate the second close request control signal and the second open request control signal to the second circuit.

In one aspect, the power distribution may further include (i) a first vehicle actuator set electrically connected to the first safety critical power rail and comprising a first brake assist system and a first steering assist system; (ii) a second vehicle actuator set electrically connected to the second safety critical power rail and comprising a second brake assist system and a second steering assist system; (iii) a first set of vehicle location and obstacle sensors electrically connected to the first safety critical power rail; (iv) a second set of vehicle location and obstacle sensors electrically connected to the second safety critical power rail; and (v) a first autonomous control unit (ACU) electrically connected to the first safety critical power rail and a second ACU electrically connected to the second critical power rail, where the first ACU and the second ACU communicate via a communication link, where the first ACU provides emergency autonomous vehicle control utilizing the first vehicle actuator set and the first set of vehicle location and obstacle sensors when the second circuit detects a fault corresponding to the second safety critical power rail, and where the second ACU provides emergency autonomous vehicle control utilizing the second vehicle actuator set and the second set of vehicle location and obstacle sensors when the first circuit detects a fault corresponding to the first safety critical power rail. The power distribution system may further include (i) a first set of lights electrically connected to the first safety critical rail and activated when the first ACU provides emergency autonomous vehicle control utilizing the first vehicle actuator set and the first set of vehicle location and obstacle sensors; and (ii) a second set of lights electrically connected to the second safety critical rail and activated when the second ACU provides emergency autonomous vehicle control utilizing the second vehicle actuator set and the second set of vehicle location and obstacle sensors. The first set of lights may receive power from the first battery when the second circuit detects a fault corresponding to the second safety critical power rail, and the second set of lights may receive power from the second battery when the first circuit detects a fault corresponding to the first safety critical power rail. The first ACU may be configured to transmit a first autonomous driving engagement signal to the first circuit when the autonomous driving function is engaged by the vehicle, and the second ACU may be configured to transmit a second autonomous driving engagement signal to the second circuit when the autonomous driving function is engaged by the vehicle. The first circuit may be configured to transmit a first fault detection signal to the first ACU when the first circuit detects a fault corresponding to the first safety critical power rail, and the second circuit may be configured to transmit a second fault detection signal to the second ACU when the second circuit detects a fault corresponding to the second safety critical power rail.

In another aspect, the first circuit may perform a first self-test on the first actuator when the vehicle is switched from the vehicle off mode to the vehicle on mode and where the first self-test determines if the first actuator is closed prior to the first circuit applying the first voltage, and the second circuit may perform a second self-test on the second actuator when the vehicle is switched from the vehicle off mode to the vehicle on mode and where the second self-test determines if the second actuator is closed prior to the second circuit applying the second voltage. If the first circuit determines that the first actuator is closed prior to the first circuit applying the first voltage then the first circuit transmits a first fault detected signal to the first ECU and the first ECU is prevented from generating the first close request control signal. If the second circuit determines that the second actuator is closed prior to the second circuit applying the second voltage then the second circuit transmits a second fault detected signal to the second ECU and the second ECU is prevented from generating the second close request control signal. The first self-test may be configured to determine a first voltage value at a first test point and a second voltage value at a second test point, the first test point and the second test point located on a portion of the general purpose power rail located between the power source and the power rail side of the first actuator, where a first resistor is located between the first test point and the second test point, and where the first safety switch passes the first self-test if the first voltage value is within 0.1 volts of the second voltage value. The second self-test may be configured to determine a third voltage value at a third test point and a fourth voltage value at a fourth test point, the third test point and the fourth test point located on a second portion of the general purpose power rail located between the power source and a power rail side of the second actuator, where a second resistor is located between the third test point and the fourth test point, and where the second safety switch passes the second self-test if the third voltage value is within 0.1 volts of the fourth voltage value.

In another aspect, the first circuit may perform a first self-test on the first actuator after the first ECU communicates the first close request control signal to the first circuit and where the first self-test determines if the first actuator is closed after the first circuit applies the first voltage, and the second circuit may perform a second self-test on the second actuator after the second ECU communicates the second close request control signal to the second circuit and where the second self-test determines if the second actuator is closed after the second circuit applies the second voltage. If the first circuit determines the first actuator is open after the first circuit applies the first voltage then the first circuit transmits a first fault detected signal to the first ECU and the first ECU communicates the first open request control signal to the first circuit. If the second circuit determines the second actuator is open after the second circuit applies the second voltage then the second circuit transmits a second fault detected signal to the second ECU and the second ECU communicates the second open request control signal to the second circuit. The first self-test may be configured to determine a first voltage value at a first test point and a second voltage value at a second test point, where the first test point is located on the general purpose power rail before the first actuator and the second test point is located on the first safety critical power rail after the first actuator, and where the first safety switch passes the first self-test if the first voltage value is within 0.1 volts of the second voltage value. The second self-test may be configured to determine a third voltage value at a third test point and a fourth voltage value at a fourth test point, where the third test point is located on the general purpose power rail before the second actuator and the fourth test point is located on the second safety critical power rail after the second actuator, and where the second safety switch passes the second self-test if the third voltage value is within 0.1 volts of the fourth voltage value.

In another aspect, the at least one diagnostic test performed by the first circuit may include determining a first test voltage on the general purpose power rail at a first test site located between the first actuator and the power source, where the test is performed after the first circuit receives the first close request control signal, and where if the first test voltage is less than a first preset voltage the first circuit discontinues applying the first voltage to the first actuator in order to open the first actuator. The at least one diagnostic test performed by the second circuit may include determining a second test voltage on the general purpose power rail at a second test site located between the second actuator and the power source, where the test is performed after the second circuit receives the second close request control signal, and where if the second test voltage is less than a second preset voltage the second circuit discontinues applying the second voltage to the second actuator in order to open the second actuator.

In another aspect, the at least one diagnostic test performed by the first circuit may include determining a first test voltage on the first safety critical power rail at a first test site located between the first actuator and the first battery, where the test is performed after the first circuit receives the first close request control signal, and where if the first test voltage is less than a first preset voltage the first circuit discontinues applying the first voltage to the first actuator in order to open the first actuator. The at least one diagnostic test performed by the second circuit may include determining a second test voltage on the second safety critical power rail at a second test site located between the second actuator and the second battery, where the test is performed after the second circuit receives the second close request control signal, and where if the second test voltage is less than a second preset voltage the second circuit discontinues applying the second voltage to the second actuator in order to open the second actuator.

In another aspect, the power source may charge the first battery when the vehicle is in the vehicle on mode and the first actuator is closed, and the power source may charge the second battery when the vehicle is in the vehicle on mode and the second actuator is closed.

In another aspect, the power source may be comprised of a high voltage (HV) battery and a DC/DC converter, where the DC/DC converter is electrically connected to the HV battery when the vehicle is in the vehicle on mode and electrically disconnected from the HV battery when the vehicle is in the vehicle off mode.

In another aspect, the power source may be comprised of an alternator, where the alternator is operational and electrically connected to the general purpose power rail when the vehicle is in the vehicle on mode, and non-operational when the vehicle is in the vehicle off mode.

In another aspect, the first actuator may be comprised of a first relay and the second actuator may be comprised of a second relay.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps or calculations, these steps or calculations should not be limited by these terms, rather these terms are only used to distinguish one step or calculation from another. For example, a first calculation could be termed a second calculation; similarly a first step could be termed a second step; similarly a first component could be termed a second component, all without departing from the scope of this disclosure. The term "battery pack" as used herein refers to one or more batteries electrically interconnected to achieve the desired voltage and capacity. The terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system.

The vehicle system described herein provides a redundant power distribution system, thereby ensuring that if the vehicle is being operated autonomously and a critical vehicle fault occurs, the car is able to autonomously move to the side of the road and stop. The redundancy in the power distribution system guarantees that even if the fault occurs within the power distribution system, the system is able to circumvent the failing portion and provide power to sufficient vehicle sensors (e.g., vehicle location and obstacle sensors) and vehicle actuators (e.g., braking and steering actuators) to allow the car to safely and autonomously pull to the side of the road and stop. While providing redundancy, the system is configured to avoid unwarranted system complexity, weight and cost. For example, the system allows a single charging system, either an alternator or a high voltage battery and DC/DC converter, to maintain the charge levels in the redundant system batteries.

Figure 1:
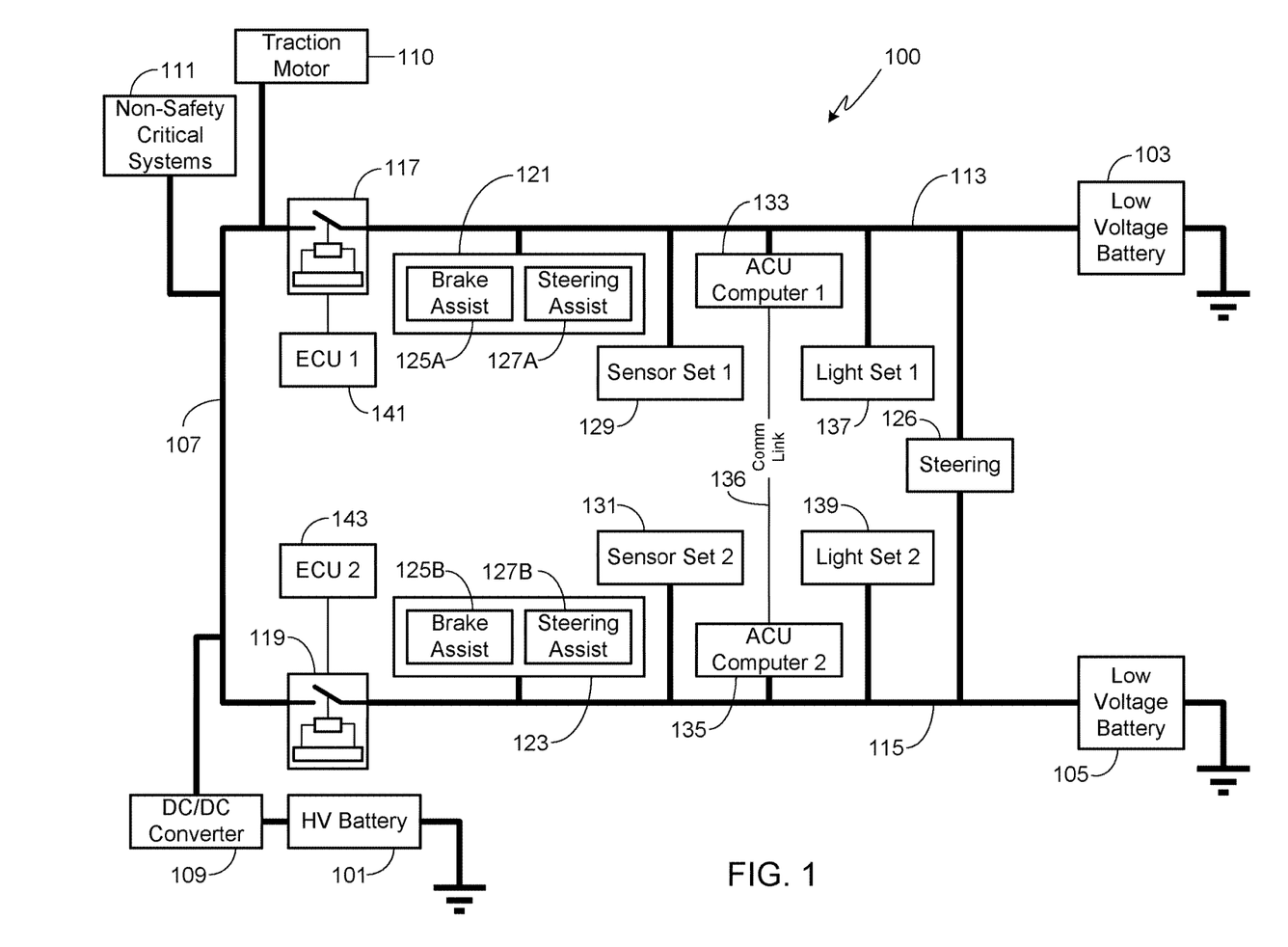
FIG. 1 provides a simplified schematic of a power distribution system in accordance with the invention that is configured for use in an EV.

FIG. 1 provides a simplified schematic of a power distribution system 100 in accordance with the invention and suitable for use in an EV, this system including a high voltage (HV) power source 101 and a pair of low voltage power sources 103/105. Low voltage power sources 103/105 are preferably standard 12 VDC batteries, similar if not identical to the 12 VDC battery used in conventional, non-EV vehicles. In this embodiment, HV source 101 is coupled to a first power rail 107 via a DC/DC converter 109. First power rail 107 is a general purpose rail that provides power for the traction motor(s) 110 as well as other systems (e.g., 111) that are not deemed safety critical (e.g., HVAC system, entertainment system, etc.). Low voltage sources 103/105 are connected to two additional power rails 113/115, respectively. Power rails 113/115 are designated safety critical rails as each of these rails can individually and independently provide the power necessary to safely stop the vehicle on the side of the road.

Figure 2:
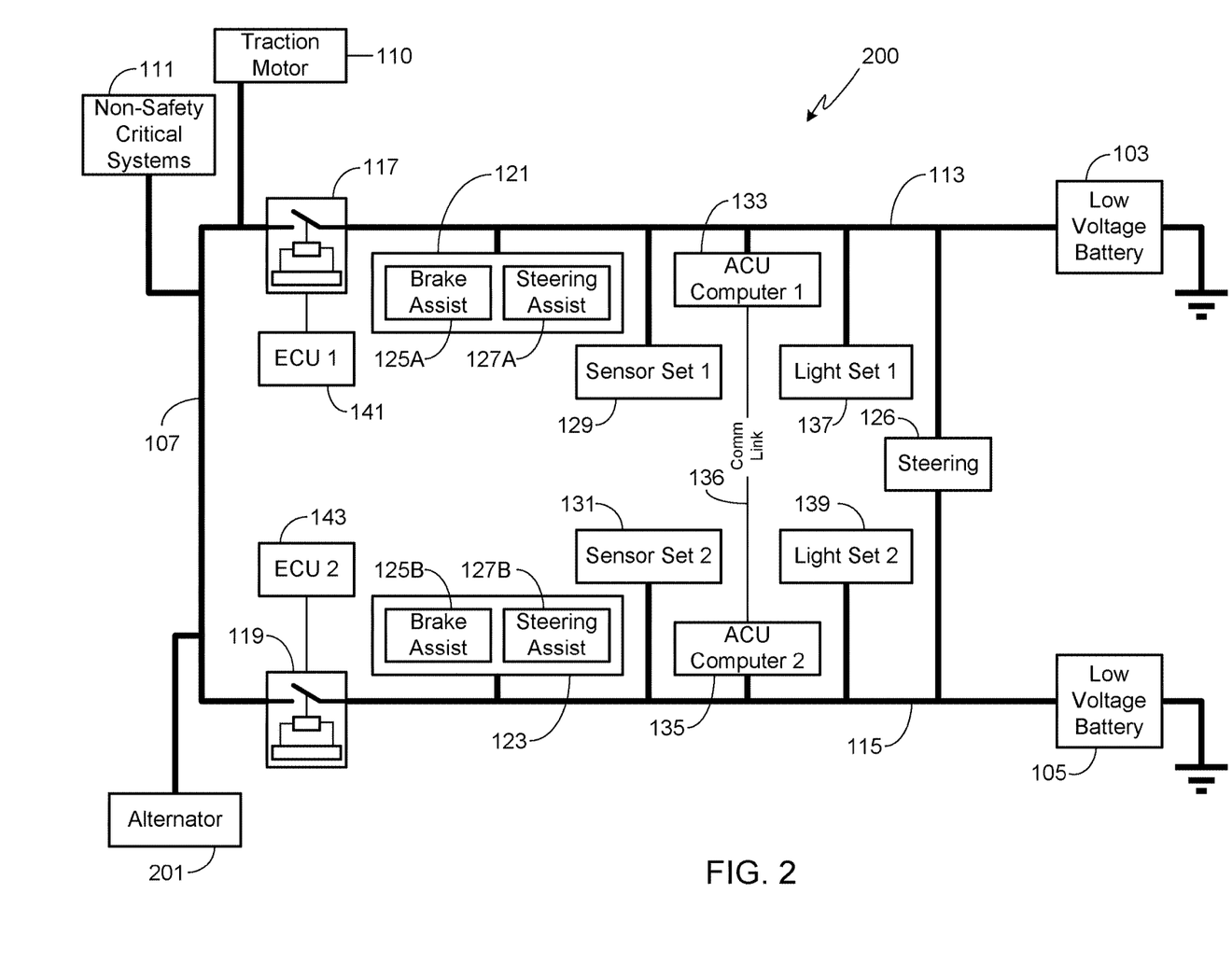
FIG. 2 provides a simplified schematic of a power distribution system in accordance with the invention that is configured for use in a non-EV.

FIG. 2 provides a simplified schematic of a power distribution system 200 that is identical to system 100, except that HV battery 101 and DC/DC converter 109 are replaced with an alternator 201. System 200 is suitable for use in a conventional vehicle utilizing an internal combustion engine.

In the invention illustrated by systems 100 and 200, a first safety switch 117 electrically connects safety critical rail 113 to general purpose rail 107 and a second safety switch 119 electrically connects safety critical rail 115 to general purpose rail 107. When switches 117 and 119 are closed, the three power rails 107, 113 and 115 are connected together. When coupled together, and assuming a system such as system 100, during operation HV battery 101 and DC/DC converter 109 maintain the charge levels on batteries 103 and 105. Assuming a system such as system 200, during normal operation with the safety switches closed, alternator 201 maintains the charge levels on batteries 103 and 105.

Associated with each safety critical rail is a set of actuators that can be used to safely bring the car to a stop at the side of the road. These actuators allow either safety critical power rail to provide the necessary power to bring the car to a stop off of the road. Although it will be appreciated that the actuators comprising each actuator set are influenced by the specific design of a particular vehicle, in general each actuator set 121/123 includes a brake assist system 125A/125B and a steering assist system 127A/127B, thus allowing the actuator set associated with either safety critical power rail to operate independently of the other system and steer the car to the side of the road using the steering assist system (i.e., either steering assist system 127A or 127B) and then stop the car using the brake assist system (i.e., either brake assist system 125A or 125B).

While actuator sets 121 and 123 may be duplicates of one another, the invention does not require that they be duplicates, only that each actuator set is capable of independently steering and braking the vehicle. As such, in a preferred embodiment one of the actuator sets utilizes a brake booster while the other actuator set utilizes the anti-lock braking (ABS) and electronic stability control (ESC) systems. This approach allows both actuator sets to assist the car's braking system in order to stop the car, but limits the extent that components are duplicated, thereby minimizing system complexity as well as cost. With respect to the steering system, and assuming that a mechanical steering rack 126 is used to steer the car, in the preferred embodiment steering assist systems 127A/127B are duplicates of one another, each including a motor assist that can steer the car as well as the necessary circuitry to control the motor assist system.

As the system (i.e., system 100 and system 200) is designed to utilize either actuator set 121 or actuator set 123 to autonomously move the vehicle to the side of the road and then stop, it will be appreciated that sensors are required to monitor the location of the vehicle relative to the roadway as well as locate potential obstacles (i.e., other vehicles, pedestrians, signs, road edge, etc.). Accordingly, each safety critical rail supplies power to a sufficient set of sensors to successfully navigate the vehicle to the side of the road while bringing the car to a stop. Sensors 129 and 131, corresponding to safety critical rails 113 and 115, respectively, may utilize any combination of sensors including cameras, radar, lidar, electromagnetic sensors, ultrasonic sensors, etc. They may utilize the same suite of sensors or a different combination of sensors. In the preferred embodiment, each sensor set 129 and 131 utilize a portion of the vehicle's sensors that are routinely used to monitor vehicle and environmental conditions.

In order to bring the car to a safe stop on the side of a road, in addition to sensing the environment with sensors 129/131 and steering and stopping the car with actuator sets 121/123, it is necessary for each of the safety critical power rails to include an autonomous control unit (ACU). It will be appreciated that the ACU required to bring the car to a safe stop at the side of the road during an emergency situation is less than that required for complete control over the vehicle during normal autonomous driving. Accordingly, coupled to safety critical power rail 113 is ACU 133 and coupled to safety critical power rail 115 is ACU 135. In the preferred embodiment, one of the ACUs is a master ACU and the other ACU is a slave ACU. The two ACUs communicate via a communication link 136 (e.g., a controlled area network (CAN bus) or an ethernet connection). While either ACU may be connected to either safety critical rail, in the illustrated embodiment ACU 133 is the master ACU and ACU 135 is the slave ACU. Preferably the master ACU is capable of performing all of the functions necessary to autonomously drive the vehicle under normal conditions while the slave ACU is only capable of performing a subset of these functions, specifically performing a sufficient number of these functions to safely bring the car to an emergency stop out of traffic.

If it becomes necessary to move the car to the side of the road and stop, and assuming that the reason for stopping is a failure associated with one of the safety critical power rails, then the ACU of the still functioning safety critical power rail uses the corresponding sensor set to monitor road and environmental conditions (e.g., potential obstacles in the vehicle's path) while using the corresponding actuator set to safely move the car to the side of the road and stop. It should be understood that if the vehicle issue causing the emergency stop is not in one of the safety critical systems, for example the vehicle's operating system detects that the air pressure in one of the tires has fallen below a critical level, then a standard, pre-programmed emergency stop under the control of the master ACU would be performed. In this scenario both sets of sensors 129/131 and both sets of actuators 121/123 would be available for use by the master ACU (e.g., ACU 133).

In addition to providing sensing, actuator and control units for each independent safety critical system, the preferred embodiments of the invention connect each safety critical rail to a set of lights. Accordingly and as illustrated, electrically connected to safety critical power rail 113 is lighting set 137 and electrically connected to safety critical power rail 115 is lighting set 139. Emergency lighting is desired in order to ensure that the vehicle is able to safely stop on the side of the road while remaining highly visible. It will be appreciated that the specific set of lights connected to each safety critical system depends upon the lighting configuration of the vehicle utilizing the power distribution system of the invention. For example, if the vehicle utilizes multiple LEDs in each headlight and taillight, then each safety critical system can utilize a portion of the LEDs in each headlight and taillight. Alternately, each safety critical system can utilize a subset of the available vehicle lights, e.g., light set 137 can include the left headlight, the right front parking light, the left taillight and the right rear parking light and light set 139 can include the right headlight, the left front parking light, the right taillight and the left rear parking light.

Safety switches 117 and 119 are used to connect and disconnect safety critical power rails 113 and 115, respectively, to general purpose power rail 107. In general, when the car is in the off mode, i.e., ICE engine off (e.g., conventional vehicle) or DC/DC converter disconnected from the HV battery (e.g., EV), both safety switches 117 and 119 are open. As a result, safety critical power rails 113 and 115 are disconnected from general purpose power rail 107. Note that at this point in time, there is no power in the general purpose power rail as the car is off. When the car is switched to the on mode, for example by turning a key to the 'on' position; alternately, pressing an 'on' button that is located on the dash, center console, or elsewhere; alternately, using a key fob, etc., each safety switch performs a self-test. If the result of the self-test for each safety switch is positive, i.e., no problem/fault detected, then the safety switches close, thereby coupling both safety critical power rails 113 and 115 to the general purpose power rail 107. If a problem/fault is detected, either during initialization or during vehicle operation, the safety switch which detected the problem/fault is opened and that particular safety critical power rail is disconnected/decoupled from the general purpose power rail 107, and thus also disconnected/decoupled from the other safety critical power rail.

Figure 3:
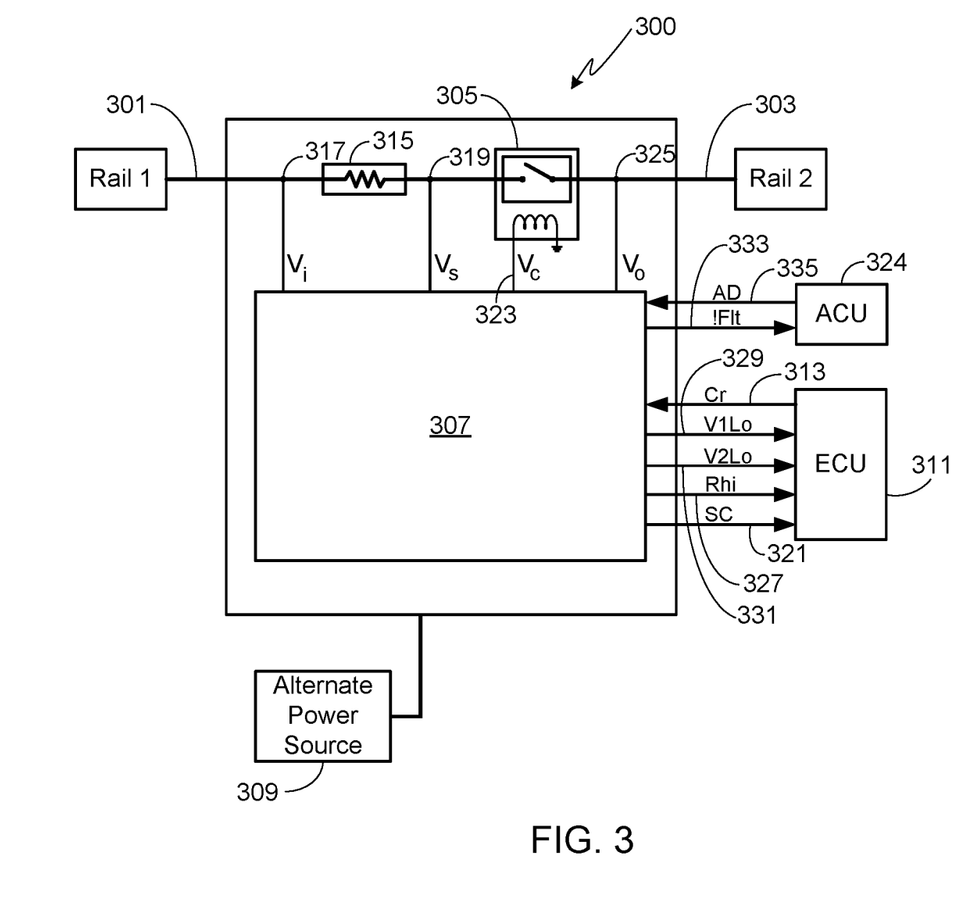
FIG. 3 provides a detailed schematic of the safety switches used in the invention.

FIG. 3 provides a detailed view of a safety switch 300, where safety switch 300 is equivalent to either safety switch 117 or safety switch 119. Power rail 301 corresponds to general power rail 107 in FIGS. 1 and 2. Safety critical power rail 303 corresponds to either safety critical power rail 113 or safety critical power rail 115. Within safety switch 300 is a power disconnect actuator 305. Power disconnect actuator 305 can be a relay or an array of FETs. Circuit 307 is the diagnostic circuit that determines whether to open or close actuator 305. Circuit 307 can be connected to, and receive power from, general power rail 301, safety critical power rail 303, or an alternate power supply (e.g., power supply 309).

Coupled to the safety switch, and more specifically connected to the circuit within the safety switch, is an electronic control unit (ECU). In FIGS. 1 and 2 safety switch 117 is electrically connected to ECU 141 and safety switch 119 is electrically connected to ECU 143. In FIG. 3 safety switch 300, and more specifically circuit 307, is electrically connected to ECU 311. When the vehicle is first switched on, and before ECU 311 sends the close request control signal (i.e., $C_r$ signal of 1) on line 313 to circuit 307 to close safety switch 300, circuit 307 performs a diagnostic test to determine whether the switch is welded shut. Note that at this point in time, i.e., before the close request signal (i.e., $C_r$=1) has been sent to circuit 307, $C_r$ is 0. To perform this self-test, the voltage before ($V_i$) and after ($V_s$) resistor 315 is determined, i.e., at points 317 and 319, respectively. If the switch is not welded shut, then $V_1$ (measured at 317) and $V_s$ (measured at 319) are equivalent. This test is represented by the SC signal on line 321, where an SC signal of 1 equates to the absolute value of $V_i$ minus $V_s$ having a value of approximately 0 (e.g., abs $(V_i-V_s)$<0.1 volts in one embodiment, and abs $(V_i-V_s)$<0.01 volts in the preferred embodiment).

If circuit 307 determines that actuator 305 of safety switch 300 is not welded shut, then the close request control signal (i.e., $C_r$=1) is sent to circuit 307 by ECU 311 on line 313. When circuit 307 receives a $C_r$ signal of 1 from ECU 311, circuit 307 applies a voltage $V_c$ to actuator 305 on control line 323, thereby closing actuator 305. At this point circuit 307 checks to make sure that actuator 305 successfully closed by determining the voltage before ($V_o$) and after ($V_s$) actuator 305, i.e., at points 325 and 319, respectively. If the relay has closed, then $V_o$ (measured at 325) and $V_s$ (measured at 319) are equivalent. This test is represented by the Rhi signal on line 327, where an Rhi signal of 1 equates to the absolute value of $V_s$ minus $V_o$ having a value of approximately 0 (e.g., abs $(V_s-V_o)$<0.1 volts in one embodiment, and abs $(V_s-V_o)$<0.01 volts in the preferred embodiment).

Once safety switch 300 has closed, critical safety rail 303 is electrically connected to general power rail 301. From this point onward, circuit 307 monitors for a fault in the electrical system. If $V_i$, $V_o$ or both become lower than a preset voltage, e.g., 9.5 V in the preferred embodiment, circuit 307 stops applying voltage $V_c$ to actuator control line 323, causing actuator 305 to open and disconnect critical safety rail 303 from general power rail 301. Note that in FIG. 3, a V1lo signal of 1 on line 329 equates to the value of $V_i$ falling below a preset value (e.g., 9.5 volts) while a V2lo signal of 1 on line 331 equates to the value of $V_o$ falling below a preset value (e.g., 9.5 volts). Thus in terms of the architecture shown in FIGS. 1 and 2, if one safety critical power rail gets shorted to ground, the voltage will drop lower than the preset voltage, the actuator corresponding to that critical safety power rail will open, and the remaining safety critical power rail will be saved from collapsing with the shorted power rail.

When the autonomous driving function is engaged, the ACU associated with each critical safety rail sends a signal (e.g., AD=1) to the corresponding safety switch indicating this engagement. Thus in systems 100 and 200, ACU 133 sends a signal (AD=1) to safety switch 117 and ACU 135 sends a signal (AD=1) to safety switch 119. In FIG. 3, ACU 324 sends the autonomous driving function engaged signal (i.e., AD=1) on line 335. If a fault is detected while the autonomous driving function is engaged, in addition to opening actuator 305 by removing voltage $V_c$ on line 323, circuit 307 sends a signal (i.e., !Flt=0) on line 333 to the ACU coupled to the corresponding safety switch (i.e., ACU 324 in FIG. 3). The ACU that receives the !Flt=0 signal, which indicates that a fault has been detected, communicates that a fault has occurred to the ACU of the other critical safety rail via comm line 136. If the ACU that receives the fault signal is unable to communicate to the other ACU due to a loss of power, the termination of communication between the two ACUs will automatically trigger the second ACU to initiate an emergency stop. Thus if ACU 133 in FIG. 1 receives the signal indicating a fault detected by safety switch 117, not only does safety switch 117 open to decouple safety power rail 113 from general power rail 107, ACU 133 communicates that a fault has occurred to ACU 135, signaling ACU 135 to perform the emergency stop maneuver utilizing the systems coupled to critical safety rail 115, i.e., actuator set 123 and sensor set 131. If ACU 133 is unable to communicate with ACU 135, the termination of communication between the two ACUs will automatically trigger ACU 135 to initiate an emergency stop.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A power distribution system configured for use in a vehicle, comprising:
   a vehicle power switch adjustable between a vehicle on mode and a vehicle off mode;
   a general purpose power rail, the general purpose power rail electrically connected to a power source when the vehicle is in the vehicle on mode and electrically disconnected from the power source when the vehicle is in the vehicle off mode;
   a first battery electrically connected to a first safety critical power rail;

a first safety switch that in response to a first close request control signal closes and electrically connects the first safety critical power rail to the general purpose power rail, and that in response to a first open request control signal opens and electrically disconnects the first safety critical power rail from the general purpose power rail, wherein the first safety switch performs at least one diagnostic test regarding the first safety critical power rail, and wherein the first safety switch opens in response to detecting a fault regarding the first safety critical power rail based on performing the at least one diagnostic test;

a first electronic control unit (ECU) coupled to the first safety switch, the first ECU generating the first close request control signal and the first open request control signal, wherein the first ECU is configured to communicate the first close request control signal and the first open request control signal to the first safety switch;

a second battery electrically connected to a second safety critical power rail;

a second safety switch that in response to a second close request control signal closes and electrically connects the second safety critical power rail to the general purpose power rail, and that in response to a second open request control signal opens and electrically disconnects the second safety critical power rail from the general purpose power rail, wherein the second safety switch performs at least one diagnostic test regarding the second safety critical power rail, and wherein the second safety switch opens in response to detecting a fault regarding the second safety critical power rail based on performing the at least one diagnostic test; and a second ECU coupled to the second safety switch, the second ECU generating the second close request control signal and the second open request control signal, wherein the second ECU is configured to communicate the second close request control signal and the second open request control signal to the second safety switch;

a first vehicle actuator set electrically connected to the first safety critical power rail, the first vehicle actuator set comprising a first brake assist system and a first steering assist system;

a second vehicle actuator set electrically connected to the second safety critical power rail, the second vehicle actuator set comprising a second brake assist system and a second steering assist system;

a first set of vehicle location and obstacle sensors electrically connected to the first safety critical power rail;

a second set of vehicle location and obstacle sensors electrically connected to the second safety critical power rail; and a first autonomous control unit (ACU) electrically connected to the first safety critical power rail and a second ACU electrically connected to the second critical power rail, wherein the first ACU and the second ACU communicate via a communication link, wherein the first ACU provides emergency autonomous vehicle control utilizing the first vehicle actuator set and the first set of vehicle location and obstacle sensors when the second safety switch detects the fault regarding the second safety critical power rail, and wherein the second ACU provides emergency autonomous vehicle control utilizing the second vehicle actuator set and the second set of vehicle location and obstacle sensors when the first safety switch detects the fault regarding the first safety critical power rail.

2. The power distribution system of claim 1, further comprising:
a first set of lights electrically connected to the first safety critical rail, the first set of lights activated when the first ACU provides emergency autonomous vehicle control utilizing the first vehicle actuator set and the first set of vehicle location and obstacle sensors; and
a second set of lights electrically connected to the second safety critical rail, the second set of lights activated when the second ACU provides emergency autonomous vehicle control utilizing the second vehicle actuator set and the second set of vehicle location and obstacle sensors.

3. The power distribution system of claim 2, wherein the first set of lights receives power from the first battery when the second safety switch detects the fault regarding the second safety critical power rail, and wherein the second set of lights receives power from the second battery when the first safety switch detects the fault regarding the first safety critical power rail.

4. The power distribution system of claim 1, wherein the first ACU transmits a first autonomous driving engagement signal to the first safety switch when an autonomous driving function is engaged by the vehicle, and
wherein the second ACU transmits a second autonomous driving engagement signal to the second safety switch when the autonomous driving function is engaged by the vehicle.

5. The power distribution system of claim 4, wherein the first safety switch transmits a first fault detection signal to the first ACU when the first safety switch detects the fault regarding the first safety critical power rail during performance of the at least one diagnostic test, and
wherein the second safety switch transmits a second fault detection signal to the second ACU when the second safety switch detects the fault regarding the second safety critical power rail during performance of the at least one diagnostic test.

6. The power distribution system of claim 1, wherein the first safety switch further comprises a first actuator, wherein the second safety switch further comprises a second actuator, wherein the first safety switch performs a first self-test on the first actuator when the vehicle is switched from the vehicle off mode to the vehicle on mode, wherein the first self-test determines if the first actuator is closed prior to the first safety switch applying a first voltage to the first actuator, wherein the second safety switch performs a second self-test on the second actuator when the vehicle is switched from the vehicle off mode to the vehicle on mode, and wherein the second self-test determines if the second actuator is closed prior to the second safety switch applying a second voltage to the second actuator.

7. The power distribution system of claim 6, wherein if the first safety switch determines the first actuator is closed prior to the first safety switch applying the first voltage then the first safety switch transmits a first fault detected signal to the first ECU and the first ECU is prevented from generating the first close request control signal, and wherein if the second safety switch determines the second actuator is closed prior to the second safety switch applying the second voltage then the second safety switch transmits a second fault detected signal to the second ECU and the second ECU is prevented from generating the second close request control signal.

8. A power distribution system configured for use in a vehicle, comprising:

a vehicle power switch adjustable between a vehicle on mode and a vehicle off mode;

a general purpose power rail, the general purpose power rail electrically connected to a power source when the vehicle is in the vehicle on mode and electrically disconnected from the power source when the vehicle is in the vehicle off mode;

a first battery electrically connected to a first safety critical power rail;

a first safety switch that in response to a first close request control signal closes and electrically connects the first safety critical power rail to the general purpose power rail, and that in response to a first open request control signal opens and electrically disconnects the first safety critical power rail from the general purpose power rail, wherein the first safety switch performs at least one diagnostic test regarding the first safety critical power rail, and wherein the first safety switch opens in response to detecting a fault regarding the first safety critical power rail based on performing the at least one diagnostic test;

a first electronic control unit (ECU) coupled to the first safety switch, the first ECU generating the first close request control signal and the first open request control signal, wherein the first ECU is configured to communicate the first close request control signal and the first open request control signal to the first safety switch;

a second battery electrically connected to a second safety critical power rail;

a second safety switch that in response to a second close request control signal closes and electrically connects the second safety critical power rail to the general purpose power rail, and that in response to a second open request control signal opens and electrically disconnects the second safety critical power rail from the general purpose power rail, wherein the second safety switch performs at least one diagnostic test regarding the second safety critical power rail, and wherein the second safety switch opens in response to detecting a fault regarding the second safety critical power rail based on performing the at least one diagnostic test;

a second ECU coupled to the second safety switch, the second ECU generating the second close request control signal and the second open request control signal, wherein the second ECU is configured to communicate the second close request control signal and the second open request control signal to the second safety switch;

wherein the first safety switch further comprises a first actuator, wherein the second safety switch further comprises a second actuator, wherein the first safety switch performs a first self-test on the first actuator when the vehicle is switched from the vehicle off mode to the vehicle on mode, wherein the first self-test determines if the first actuator is closed prior to the first safety switch applying a first voltage to the first actuator, wherein the second safety switch performs a second self-test on the second actuator when the vehicle is switched from the vehicle off mode to the vehicle on mode, and wherein the second self-test determines if the second actuator is closed prior to the second safety switch applying a second voltage to the second actuator;

wherein the first self-test determines a first voltage value at a first test point and a second voltage value at a second test point, the first test point and the second test point located on a portion of the general purpose power rail, the portion of the general purpose power rail located between the power source and a power rail side of the first actuator, wherein a first resistor is located between the first test point and the second test point, wherein the first safety switch passes the first self-test if the first voltage value is within a voltage threshold of the second voltage value, and wherein the second self-test determines a third voltage value at a third test point and a fourth voltage value at a fourth test point, the third test point and the fourth test point located on a second portion of the general purpose power rail, the second portion of the general purpose power rail located between the power source and a power rail side of the second actuator, wherein a second resistor is located between the third test point and the fourth test point, wherein the second safety switch passes the second self-test if the third voltage value is within a voltage threshold of the fourth voltage value.

9. The power distribution system of claim 1, wherein the first safety switch further comprises a first actuator, wherein the second safety switch further comprises a second actuator, wherein the first safety switch performs a first self-test on the first actuator after the first ECU communicates the first close request control signal to the first safety switch, wherein the first self-test determines if the first actuator is closed after the first safety switch applies a first voltage to the first actuator, wherein the second safety switch performs a second self-test on the second actuator after the second ECU communicates the second close request control signal to the second safety switch, wherein the second self-test determines if the second actuator is closed after the second safety switch applies the second voltage.

10. The power distribution system of claim 9, wherein if the first safety switch determines the first actuator is open after the first safety switch applies the first voltage then the first safety switch transmits a first fault detected signal to the first ECU and the first ECU communicates the first open request control signal to the first safety switch, wherein if the second safety switch determines the second actuator is open after the second safety switch applies the second voltage then the second safety switch transmits a second fault detected signal to the second ECU and the second ECU communicates the second open request control signal to the second safety switch.

11. The power distribution system of claim 9, A power distribution system configured for use in a vehicle, comprising:

a vehicle power switch adjustable between a vehicle on mode and a vehicle off mode;

a general purpose power rail, the general purpose power rail electrically connected to a power source when the vehicle is in the vehicle on mode and electrically disconnected from the power source when the vehicle is in the vehicle off mode;

a first battery electrically connected to a first safety critical power rail;

a first safety switch that in response to a first close request control signal closes and electrically connects the first safety critical power rail to the general purpose power rail, and that in response to a first open request control signal opens and electrically disconnects the first safety critical power rail from the general purpose power rail, wherein the first safety switch performs at least one diagnostic test regarding the first safety critical power rail, and wherein the first safety switch opens in response to detecting a fault regarding the first safety critical power rail based on performing the at least one diagnostic test;
a first electronic control unit (ECU) coupled to the first safety switch, the first ECU generating the first close request control signal and the first open request control signal, wherein the first ECU is configured to communicate the first close request control signal and the first open request control signal to the first safety switch;
a second battery electrically connected to a second safety critical power rail;
a second safety switch that in response to a second close request control signal closes and electrically connects the second safety critical power rail to the general purpose power rail, and that in response to a second open request control signal opens and electrically disconnects the second safety critical power rail from the general purpose power rail, wherein the second safety switch performs at least one diagnostic test regarding the second safety critical power rail, and wherein the second safety switch opens in response to detecting a fault regarding the second safety critical power rail based on performing the at least one diagnostic test;
a second ECU coupled to the second safety switch, the second ECU generating the second close request control signal and the second open request control signal, wherein the second ECU is configured to communicate the second close request control signal and the second open request control signal to the second safety switch;
wherein the first safety switch further comprises a first actuator, wherein the second safety switch further comprises a second actuator, wherein the first safety switch performs a first self-test on the first actuator after the first ECU communicates the first close request control signal to the first safety switch, wherein the first self-test determines if the first actuator is closed after the first safety switch applies a first voltage to the first actuator, wherein the second safety switch performs a second self-test on the second actuator after the second ECU communicates the second close request control signal to the second safety switch, wherein the second self-test determines if the second actuator is closed after the second safety switch applies the second voltage;
wherein the first self-test determines a first voltage value at a first test point and a second voltage value at a second test point, the first test point located on the general purpose power rail before the first actuator and the second test point located on the first safety critical power rail after the first actuator, wherein the first safety switch passes the first self-test if the first voltage value is within a voltage threshold of the second voltage value, and
wherein the second self-test determines a third voltage value at a third test point and a fourth voltage value at a fourth test point, the third test point located on the general purpose power rail before the second actuator and the fourth test point located on the second safety critical power rail after the second actuator, wherein the second safety switch passes the second self-test if the third voltage value is within a voltage threshold of the fourth voltage value.

12. The power distribution system of claim 1, wherein the first safety switch further comprises a first actuator, wherein the second safety switch further comprises a second actuator, wherein the at least one diagnostic test performed by the first safety switch further comprises determining a first test voltage on the general purpose power rail at a first test site located between the first actuator and the power source, the at least one diagnostic test performed by the first safety switch after the first close request control signal is received, wherein if the first test voltage is less than a first preset voltage the first actuator is opened; and
wherein the at least one diagnostic test performed by the second safety switch further comprises determining a second test voltage on the general purpose power rail at a second test site located between the second actuator and the power source, the at least one diagnostic test performed by the second safety switch after the second close request control signal is received, wherein if the second test voltage is less than a second preset voltage the second actuator is opened.

13. The power distribution system of claim 1, wherein the first safety switch further comprises a first actuator, wherein the second safety switch further comprises a second actuator, wherein the at least one diagnostic test performed by the first safety switch further comprises determining a first test voltage on the first safety critical power rail at a first test site located between the first actuator and the first battery, the at least one diagnostic test performed by the first safety switch after the first close request control signal is received, wherein if the first test voltage is less than a first preset voltage the first safety switch opens the first actuator; and
wherein the at least one diagnostic test performed by the second safety switch further comprises determining a second test voltage on the second safety critical power rail at a second test site located between the second actuator and the second battery, the at least one diagnostic test performed by the second safety switch after the second close request control signal is received, wherein if the second test voltage is less than a second preset voltage the second safety switch opens the second actuator.

14. The power distribution system of claim 13, wherein the power source charges the first battery when the vehicle is in the vehicle on mode and the first actuator is closed, and wherein the power source charges the second battery when the vehicle is in the vehicle on mode and the second actuator is closed.

15. The power distribution system of claim 13, wherein the first actuator includes a first relay, and the second actuator includes a second relay.

16. The power distribution system of claim 1, the power source comprising a high voltage (HV) battery and a DC/DC converter, wherein the DC/DC converter is electrically connected to the HV battery when the vehicle is in the vehicle on mode, and wherein the DC/DC converter is electrically disconnected from the HV battery when the vehicle is in the vehicle off mode.

17. The power distribution system of claim 1, the power source comprising an alternator, wherein the alternator is operational and electrically connected to the general purpose power rail when the vehicle is in the vehicle on mode, and wherein the alternator is non-operational when the vehicle is in the vehicle off mode.

18. The power distribution system of claim 1, wherein the communication link is a controlled area network bus or an ethernet connection.

19. The power distribution system of claim 1, wherein the one of the first ACU or the second ACU that detects the fault regarding the second safety critical power rail or the first safety critical power rail, respectively, is configured to communicate the fault to the other of the first ACU or the second ACU.

20. The power distribution system of claim 19, wherein termination of communication on the communication link causes the one of the first ACU or the second ACU that detects the fault regarding the second safety critical power rail or the first safety critical power rail, respectively, to initiate an emergency stop of the vehicle.

\* \* \* \* \*